US011077780B2

(12) United States Patent
Akaike et al.

(10) Patent No.: US 11,077,780 B2
(45) Date of Patent: Aug. 3, 2021

(54) SEAT (71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/773,178

(22) Filed: Jan. 27, 2020

(65) Prior Publication Data

US 2020/0238873 A1 Jul. 30, 2020

(30) Foreign Application Priority Data

Jan. 30, 2019 (JP) .............................. JP2019-014194

(51) Int. Cl.
| *B60N 2/56* | (2006.01) |
| *A47C 1/10* | (2006.01) |
| *B60R 22/28* | (2006.01) |
| *B60N 2/885* | (2018.01) |
| *B60N 2/809* | (2018.01) |
| *B60N 2/879* | (2018.01) |
| *B60N 2/20* | (2006.01) |

(52) U.S. Cl.
CPC ............... *B60N 2/885* (2018.02); *B60N 2/20* (2013.01); *B60N 2/5657* (2013.01); *B60N 2/809* (2018.02); *B60N 2/879* (2018.02)

(58) Field of Classification Search
CPC .......... B60N 2/885; B60N 2/809; B60N 2/68; B60N 2/22; B60N 2/986; B60N 2/80

USPC ...................................................... 297/354.1
See application file for complete search history.

(56) References Cited

U.S. PATENT DOCUMENTS

| 2,464,435 | A | * | 3/1949 | Conradt ................. B60N 2/885 |
| | | | | 297/397 |
| 4,440,443 | A | * | 4/1984 | Nordskog ........ B64D 11/00154 |
| | | | | 297/397 |
| 4,991,222 | A | * | 2/1991 | Nixdorf ................. H04R 5/023 |
| | | | | 297/391 |
| D331,520 | S | * | 12/1992 | Ruddy ........................... D6/601 |
| 5,694,320 | A | * | 12/1997 | Breed .................... B60N 2/002 |
| | | | | 701/45 |
| 6,088,640 | A | * | 7/2000 | Breed .................... B60N 2/002 |
| | | | | 701/45 |
| 6,120,099 | A | * | 9/2000 | Reikerås ................ B60N 2/809 |
| | | | | 297/391 |

(Continued)

FOREIGN PATENT DOCUMENTS

JP 2019-1378 1/2019

*Primary Examiner* — Shin H Kim (74) *Attorney, Agent, or Firm* — Greenblum & Bernstein, P.L.C.

(57) ABSTRACT

A seat includes: a backrest configured to support a back of a seated occupant; a headrest provided to an upper portion of the backrest and configured to support a back of a head of the seated occupant; an overhang portion configured to overhang forward so as to laterally cover the head of the seated occupant from a side portion of the headrest; an overhang adjustment mechanism capable of adjusting an overhang amount of the overhang portion; and a height adjustment mechanism capable of adjusting a height position of the headrest with respect to the backrest.

8 Claims, 10 Drawing Sheets

(56) References Cited

U.S. PATENT DOCUMENTS

| | | | |
|---|---|---|---|
| 6,508,513 B1 * | 1/2003 | Hall | A47C 7/546 297/398 |
| 6,513,871 B2 * | 2/2003 | Bartels | B60N 2/885 297/216.12 |
| 6,601,804 B2 * | 8/2003 | Bisch | A47C 7/383 248/118 |
| 6,648,416 B2 * | 11/2003 | O'Connor | A47C 7/383 297/397 |
| 6,666,517 B2 * | 12/2003 | Clough | B60N 2/885 297/410 |
| D498,097 S * | 11/2004 | Schwyzer | D6/716.5 |
| 7,144,083 B2 * | 12/2006 | List | B60N 2/885 297/391 |
| D539,572 S * | 4/2007 | Nguyen | D6/716.5 |
| 7,364,239 B2 * | 4/2008 | Clough | A47C 7/38 297/391 |
| 7,631,935 B2 * | 12/2009 | Chen | B60N 2/2851 297/284.9 |
| 8,295,535 B2 * | 10/2012 | Tracy | B64D 11/0015 381/389 |
| 8,550,561 B2 * | 10/2013 | Ikeya | B60N 2/847 297/410 |
| 8,950,813 B2 * | 2/2015 | Nawaz | B60N 2/844 297/406 |
| 8,985,622 B1 * | 3/2015 | Cannon | B60R 21/207 280/730.2 |
| 9,463,721 B2 * | 10/2016 | Reese | B60N 2/914 |
| 9,611,041 B2 * | 4/2017 | Baker | B60N 2/885 |
| 9,783,304 B2 * | 10/2017 | Zheng | B60N 2/80 |
| 10,202,196 B2 * | 2/2019 | Hontz | B60N 2/879 |
| 10,479,504 B2 * | 11/2019 | Tracy | H04R 5/023 |
| 10,525,858 B2 * | 1/2020 | Hickman Guevara | B60N 2/879 |
| 10,556,563 B2 * | 2/2020 | Song | B60R 21/207 |
| 2002/0057006 A1 * | 5/2002 | Bargheer | B60N 2/5635 297/180.14 |
| 2002/0063451 A1 * | 5/2002 | Bargheer | B60H 1/00285 297/180.12 |
| 2012/0292973 A1 * | 11/2012 | Westerink | B64D 11/06 297/391 |
| 2014/0375100 A1 * | 12/2014 | Reese | B60N 2/806 297/391 |
| 2015/0197170 A1 * | 7/2015 | Obukhov | B60R 21/207 297/391 |
| 2015/0239369 A1 * | 8/2015 | Hoshi | B60N 2/225 297/362.12 |
| 2015/0239380 A1 * | 8/2015 | Sugiyama | B60N 2/4263 297/452.18 |
| 2015/0306978 A1 * | 10/2015 | Watanabe | B60N 2/062 297/344.1 |
| 2016/0107553 A1 * | 4/2016 | Imajo | B60N 2/20 297/452.18 |
| 2018/0361891 A1 * | 12/2018 | Kato | B60H 1/00285 |
| 2019/0359106 A1 * | 11/2019 | Suzuki | B60N 2/885 |
| 2020/0238873 A1 * | 7/2020 | Akaike | B60N 2/5657 |
| 2020/0262565 A1 * | 8/2020 | Wanner | B60N 2/838 |
| 2020/0369188 A1 * | 11/2020 | Samain | B60N 2/865 |

* cited by examiner

SEAT

CROSS-REFERENCE TO RELATED APPLICATIONS

This application claims priority from Japanese Patent Application No. 2019-014194 filed on Jan. 30, 2019, the entire contents of which are incorporated herein by reference.

TECHNICAL FIELD

The present disclosure relates to a seat. More specifically, the present disclosure relates to a seat including a backrest configured to support a back of a seated occupant and a headrest provided to an upper portion of the backrest and configured to support a back portion of a head of the seated occupant.

BACKGROUND

Patent Literature JP-A-2019-001378 discloses a seat in which overhang portions that overhang forward to surround a head of a seated occupant are formed in both left and right side portions of a headrest. Due to the overhang portions, a visual field on both left and right sides of the seated occupant is narrowed, and a personal space is formed.

In the related art described above, positions of the overhang portions may be shifted from the head due to a shift of the back of the seated occupant which accompanies reclining of a seat back.

SUMMARY

The present disclosure has been made in view of the above problems, and an object to be solved by the present disclosure is to appropriately adjust a position of an overhang portion that laterally covers a head of a seated occupant according to a seated state of the seated occupant.

In order to solve the above problems, a seat according to the present disclosure includes: a backrest configured to support a back of a seated occupant; and a headrest provided to an upper portion of the backrest and configured to support a back of a head of the seated occupant; an overhang portion configured to overhang forward so as to laterally cover the head of the seated occupant from a side portion of the headrest; an overhang adjustment mechanism capable of adjusting an overhang amount of the overhang portion; and a height adjustment mechanism capable of adjusting a height position of the headrest with respect to the backrest.

DETAILED DESCRIPTION

Embodiments of the present disclosure will be described below with reference to the drawings.

First, a configuration of a seat 1 according to a first embodiment of the present disclosure will be described with reference to FIGS. 1 to 10. In the following description, directions such as front, rear, upper, lower, left, and right, respectively indicate directions shown in the drawings. In addition, a "seat width direction" indicates a left-right direction of the seat 1.

(Schematic Configuration of Seat 1)

Figure 1:
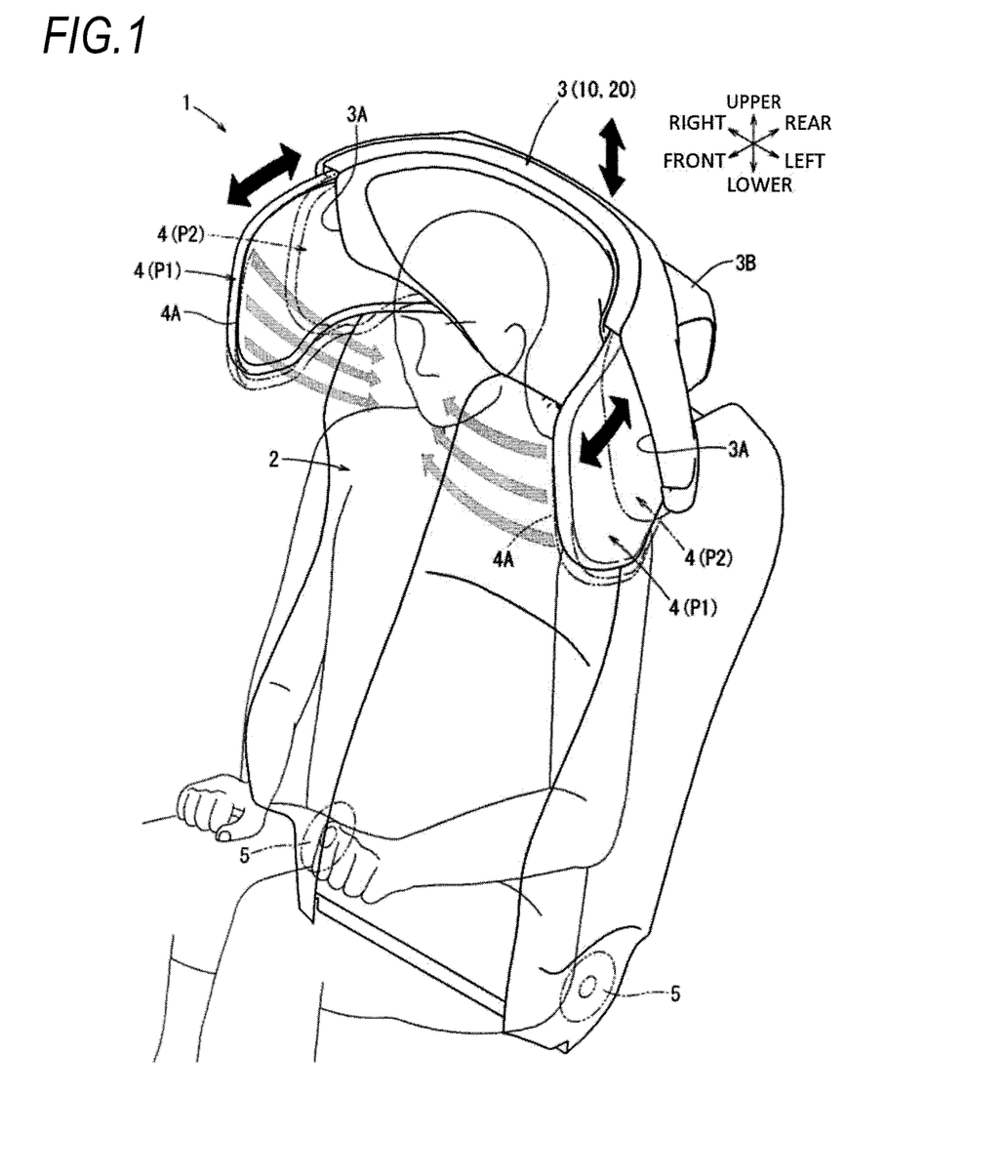
FIG. 1 is a perspective view showing a schematic configuration of a seat according to a first embodiment.
Figure 2:
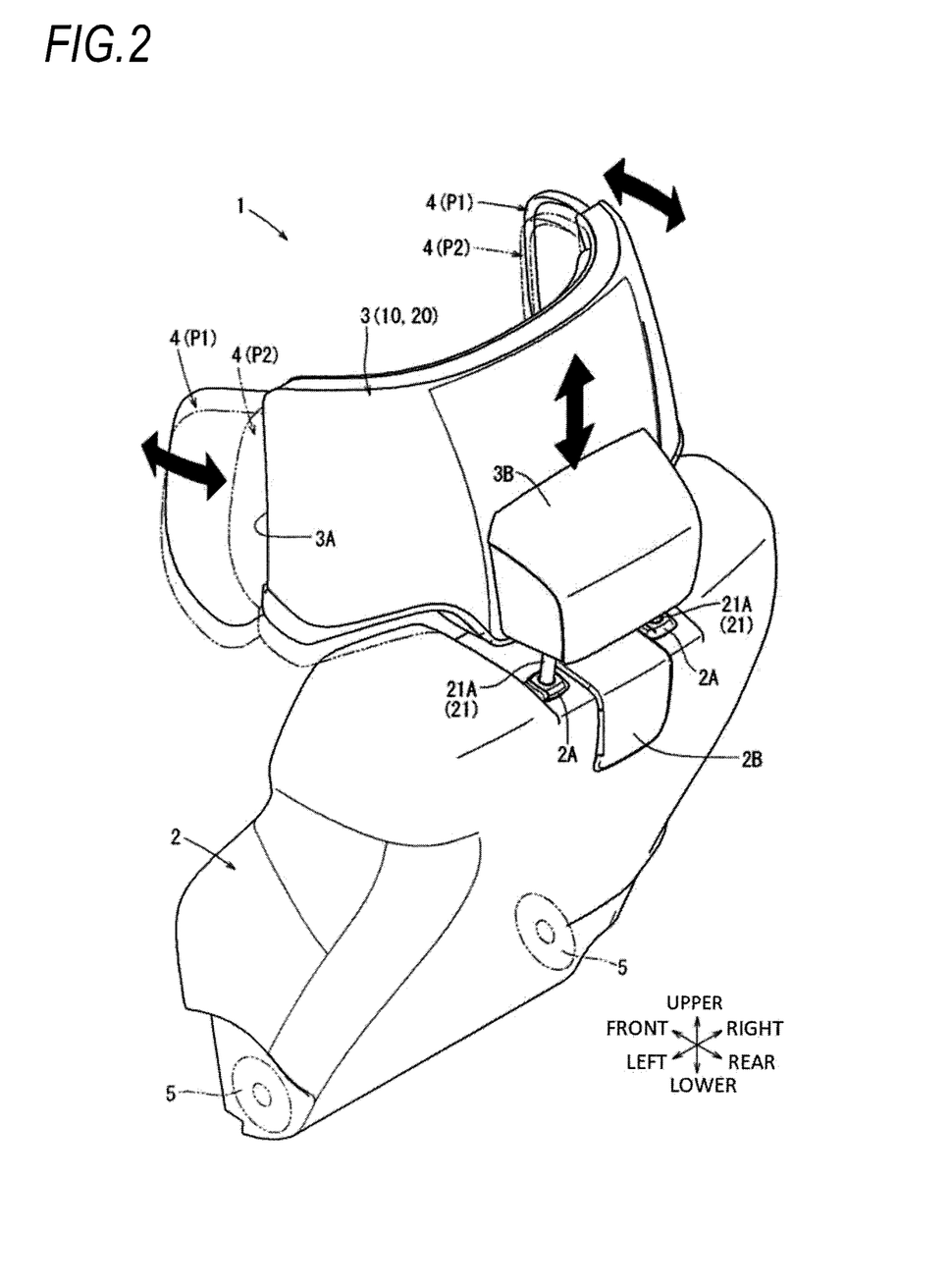
FIG. 2 is a rear perspective view of the seat in FIG. 1.

The seat 1 according to the present embodiment is configured as a rear seat of an automobile. As shown in FIGS. 1 and 2, the seat 1 includes a seat back 2 serving as a backrest for a seated occupant, a seat cushion (not shown) serving as a seating portion, and a headrest 3 that supports a back of a head of the seated occupant. Here, the seat back 2 corresponds to the "backrest" of the present disclosure, and the headrest 3 corresponds to a "headrest" of the present disclosure.

Lower end portions of both left and right sides of the seat back 2 are respectively connected to rear end portions of both left and right sides of the seat cushion via recliners 5. By the above-described connection, the seat back 2 is configured such that a backrest angle with respect to the seat cushion (not shown) can be adjusted in a front-rear direction. The recliners 5 may be of a so-called electric type or a manual type, but in the present embodiment, an electric type configuration is adopted.

The recliners 5 are operated by an electric switch provided at a position such as an outer side portion of a seat cushion (not shown) by a user, whereby the backrest angle of the seat back 2 is tilted rearward or raised frontward in accordance with the operation. The recliners 5 correspond to a "backrest angle adjustment mechanism" of the present disclosure.

Figure 3:
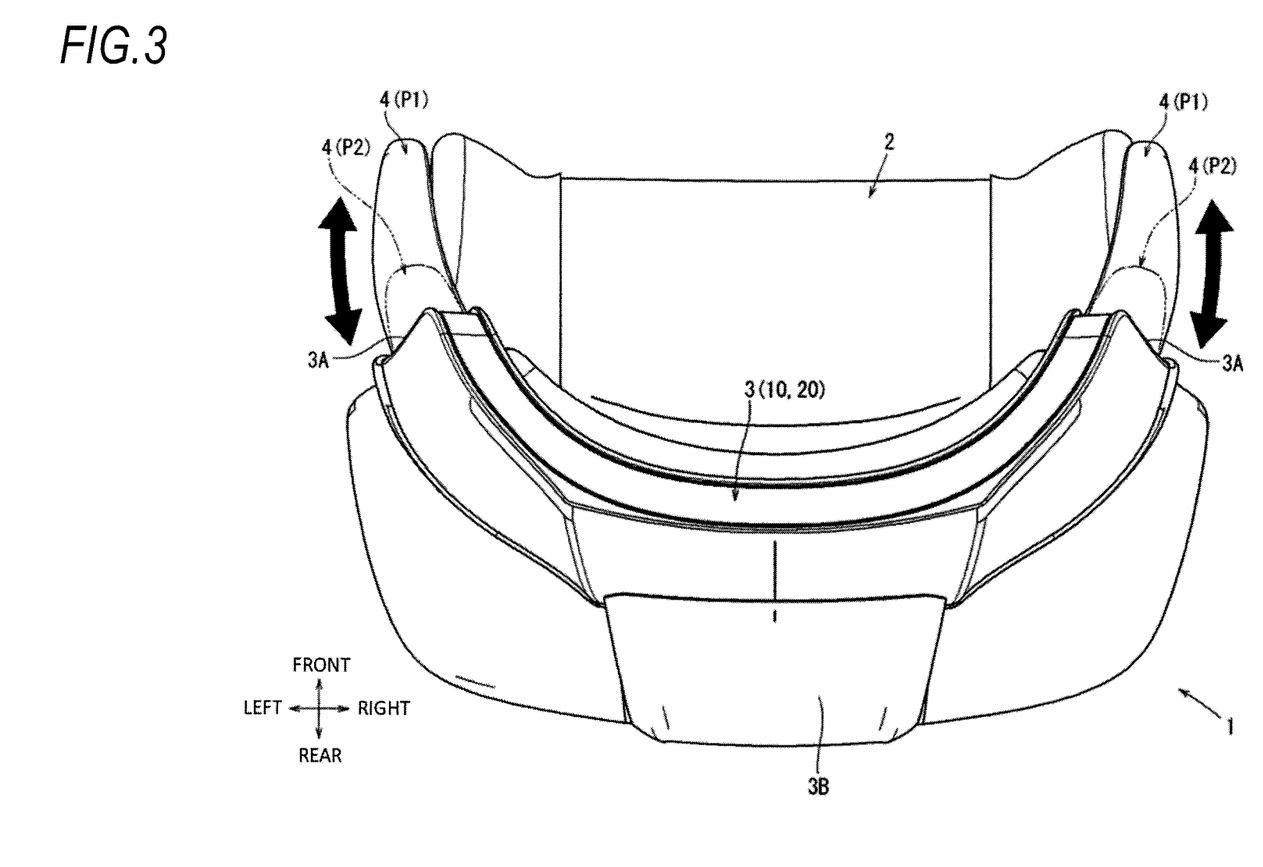
FIG. 3 is a plan view of the seat in FIG. 1.

The headrest 3 is mounted to an upper portion of the seat back 2 by being inserted from above. As shown in FIG. 3, the headrest 3 is formed to be recessed in a concave curved surface shape such that a top plate main surface that supports the back of the head of the seated occupant can receive so as to wrap the back of the head from both sides. Both left and right sides of the headrest 3 are respectively provided with resin shades 4 that protrude forward from side portions of both sides and laterally cover the head of the seated occupant. Here, each shade 4 corresponds to an "overhang portion" of the present disclosure.

Each shade 4 is formed in a curved plate shape overhanging so as to rise forward in a concave curved surface shape from both sides of the top plate main surface of the headrest 3 recessed in the concave curved surface shape. Each shade 4 is individually drive-controlled so as to be moved to any position between a retracted position P2 indicated by a virtual line and an overhung position P1 indicated by a solid line in FIGS. 1 and 3 by an electric overhang adjustment mechanism 10 provided in the headrest 3.

Each shade 4 is drawn into the retracted position P2, whereby a visual field on both left and right sides of the seated occupant can be widened. Each shade 4 overhangs to the overhung position P1 or an intermediate position thereof, whereby a personal space can be formed by narrowing the visual field on both left and right sides of the seated occupant. One of the shades 4 overhangs and the other is retracted, whereby the shade 4 can shade from the outer window while opening a visual field with respect to an adjacent seat or vice versa depending on a form of the shade 4.

Figure 4:
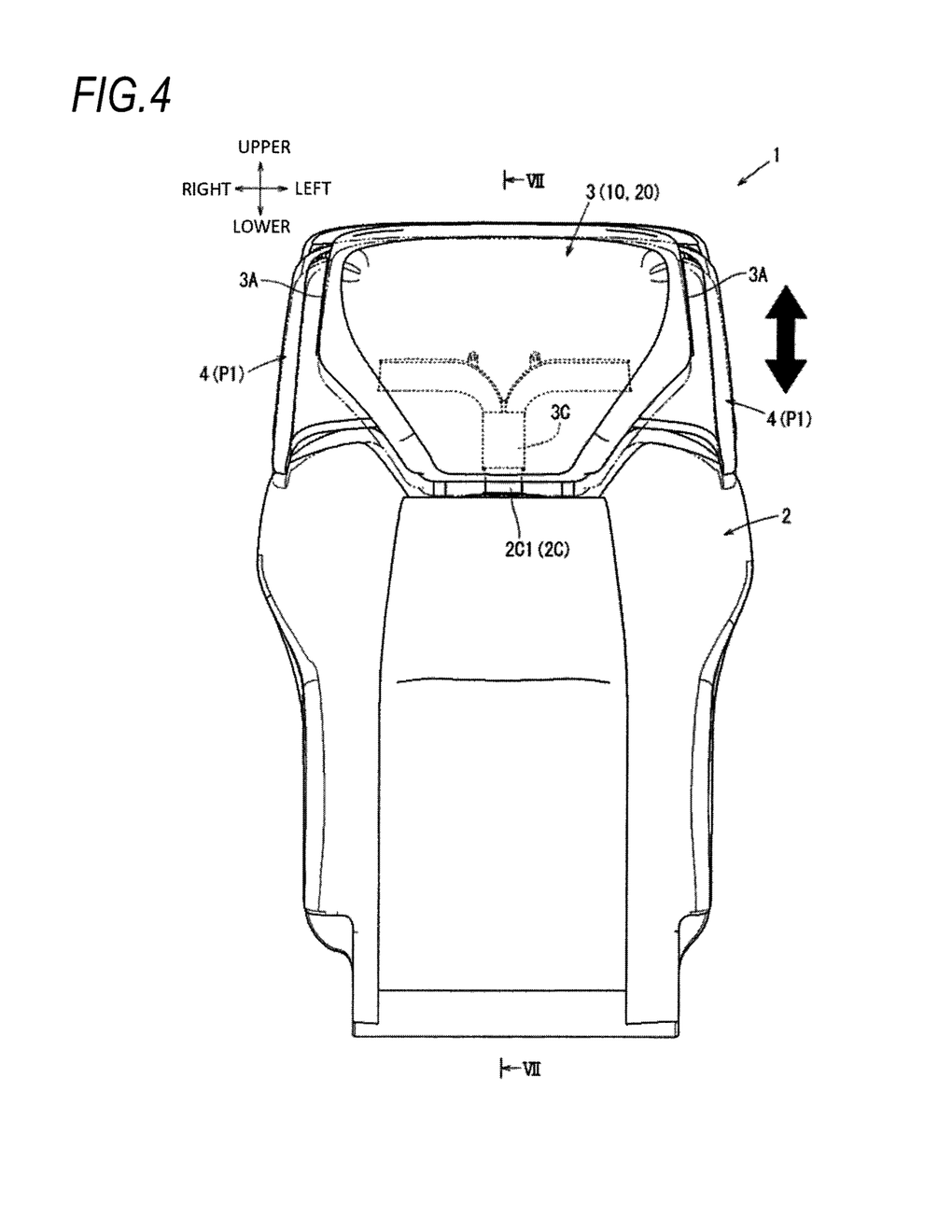
FIG. 4 is a front view of the seat in FIG. 1.
Figure 8:
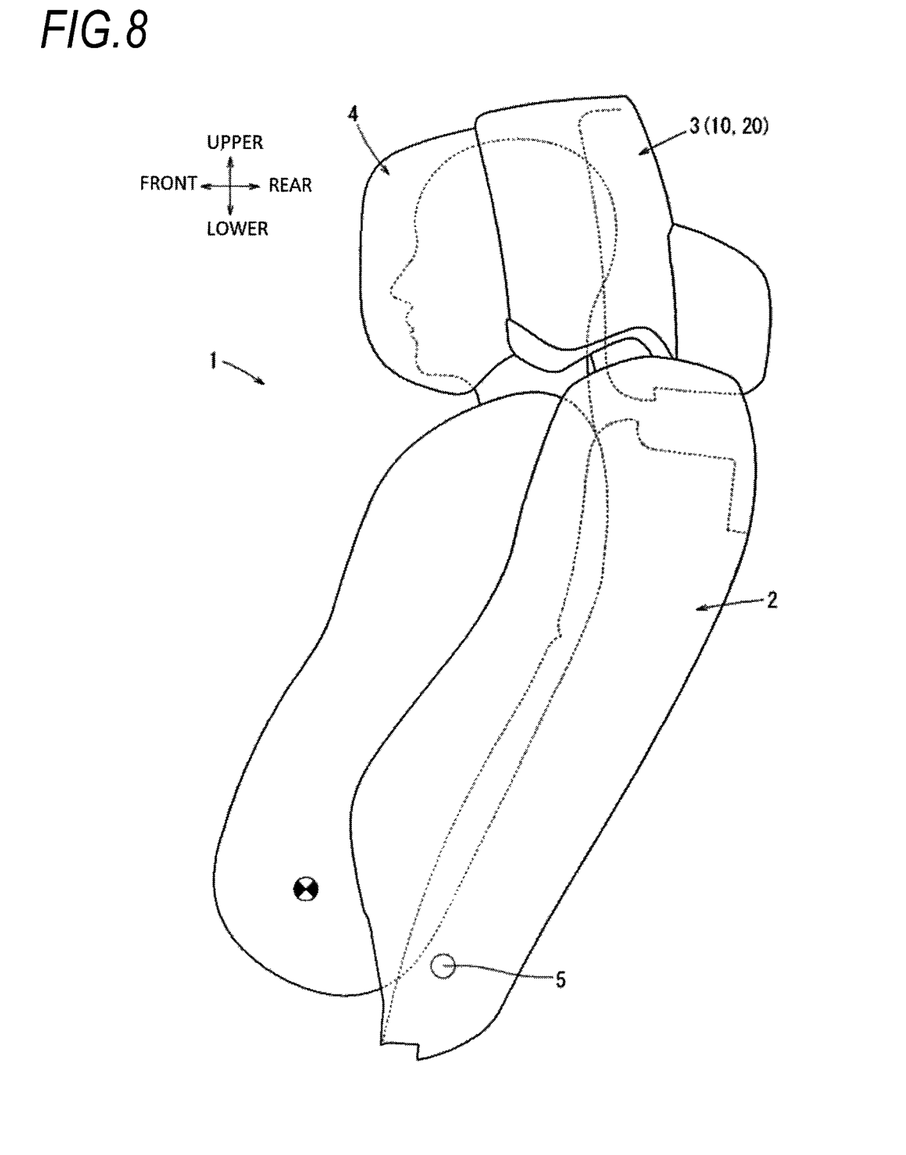
FIG. 8 is a side view schematically showing a seated state when the backrest is in a neutral position.
Figure 9:
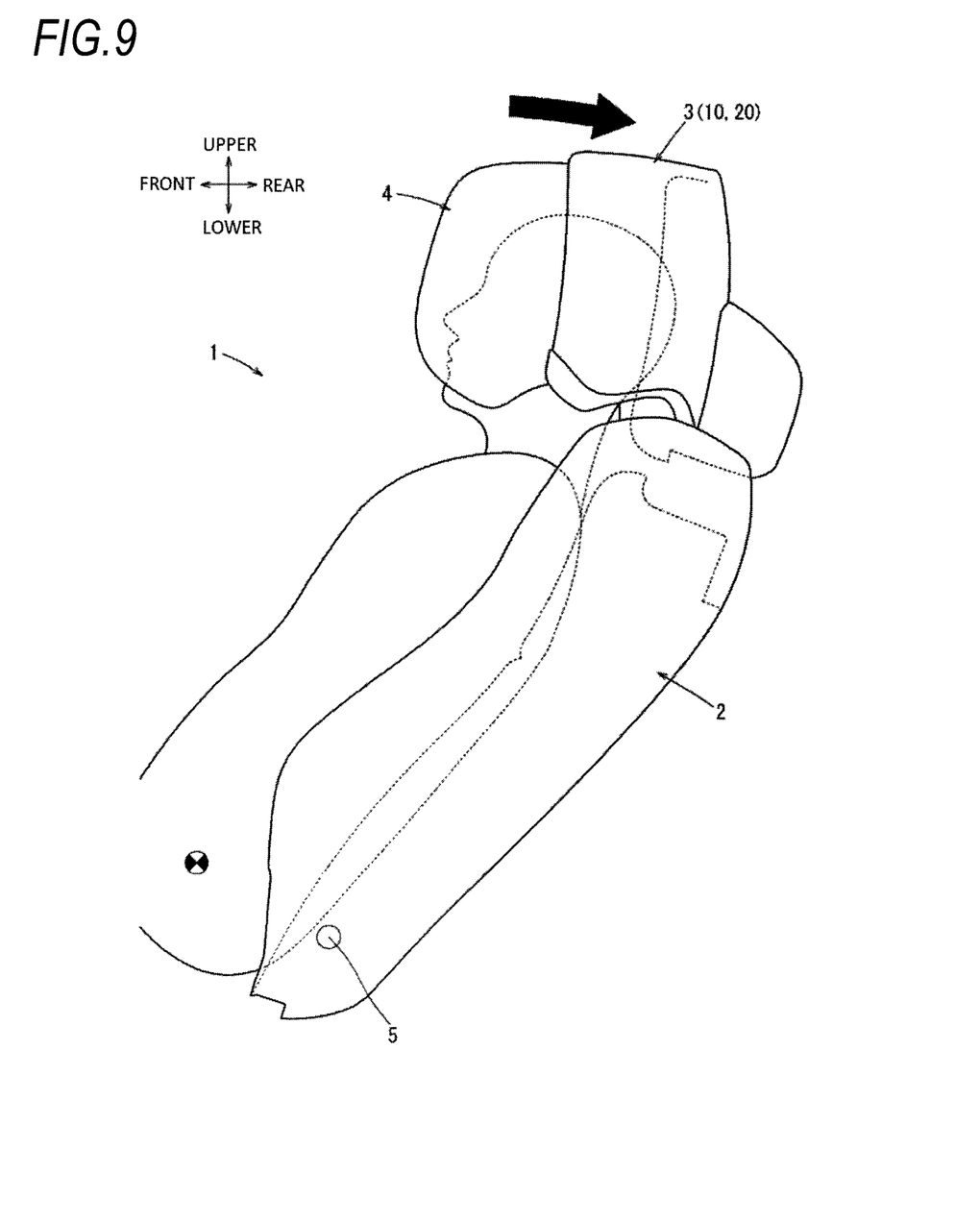
FIG. 9 is a side view schematically showing a seated state when the backrest is reclined.
Figure 10:
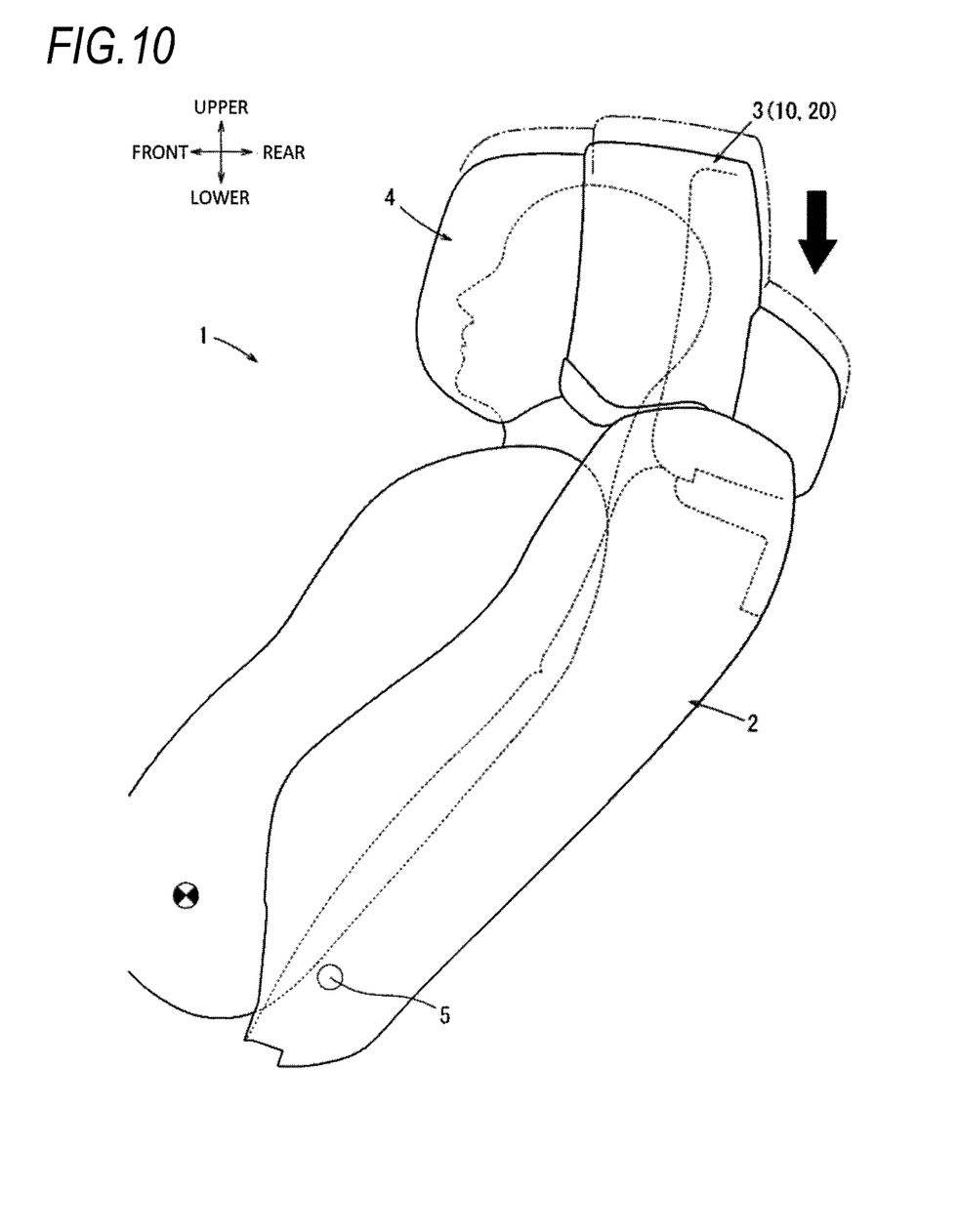
FIG. 10 is a side view showing a state in which a height position of the headrest is adjusted from the state in FIG. 9.

As shown in FIGS. 1 and 4, the headrest 3 is further provided with an electric height adjustment mechanism 20 capable of adjusting a height position of the headrest 3 with respect to the seat back 2 to any position. As shown in FIG. 8, the headrest 3 can be freely adjusted to an optimum height position according to physique of the seated occupant by the height adjustment mechanism 20. Even when a position facing the head is shifted due to a shift of the back of the seated occupant which accompanies reclining of the seat back 2 as shown in FIG. 9, the headrest 3 can be appropriately adjusted to a position facing the head of the seated occupant as shown in FIG. 10.

Therefore, the headrest 3 can always be adjusted to a position that matches the head of the seated occupant, and each shade 4 overhanging from the headrest 3 can also overhang to a position that matches the head of the seated occupant.

(Specific Configuration of Each Portion)

Figure 5:
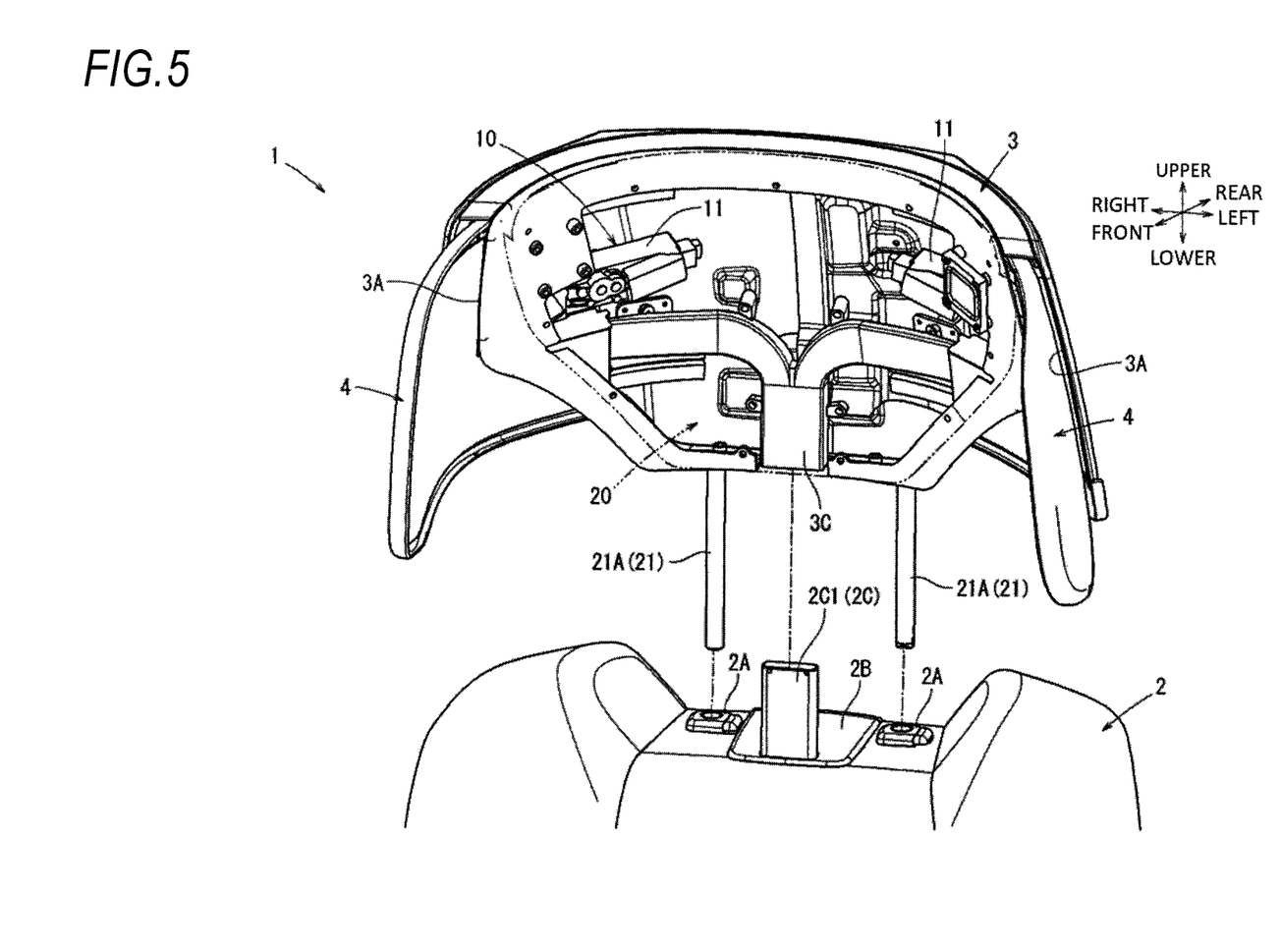
FIG. 5 is a perspective view showing a state in which a headrest is removed from a backrest.
Figure 6:
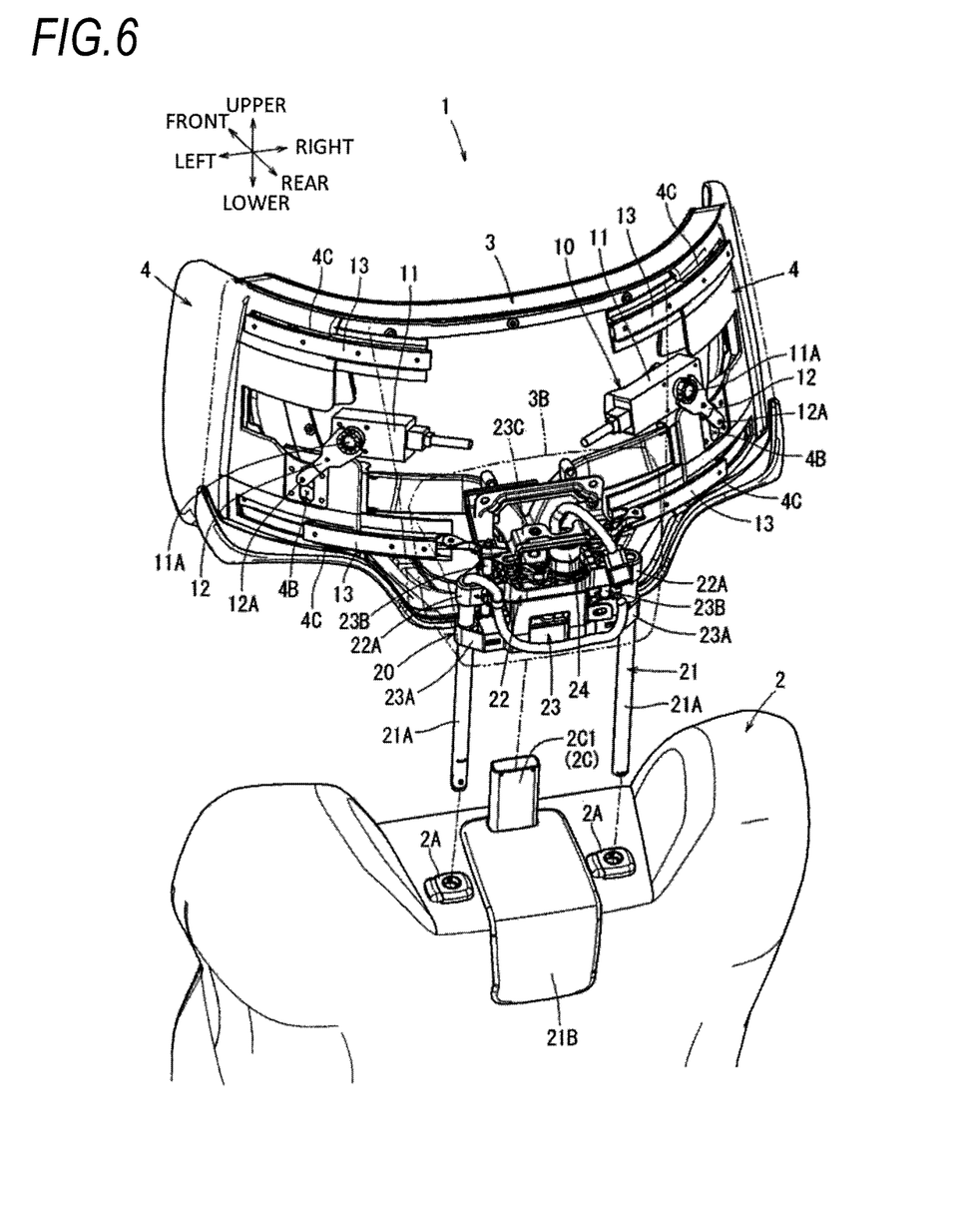
FIG. 6 is a rear perspective view of the seat in FIG. 5.

Hereinafter, a specific configuration of each of the above-described portions will be described in detail. As shown in FIGS. 5 and 6, an upper surface portion of the seat back 2 is provided with headrest supports 2A to which a pair of left and right leg portions 21A of a headrest stay 21 hanging down from a lower surface portion of the headrest 3 can be mounted by being inserted from above. In addition, a resin fixed duct 2C that allows air to flow toward the headrest 3 is fixed inside the seat back 2. Here, the fixed duct 2C corresponds to a "duct" of the present disclosure.

Figure 7:
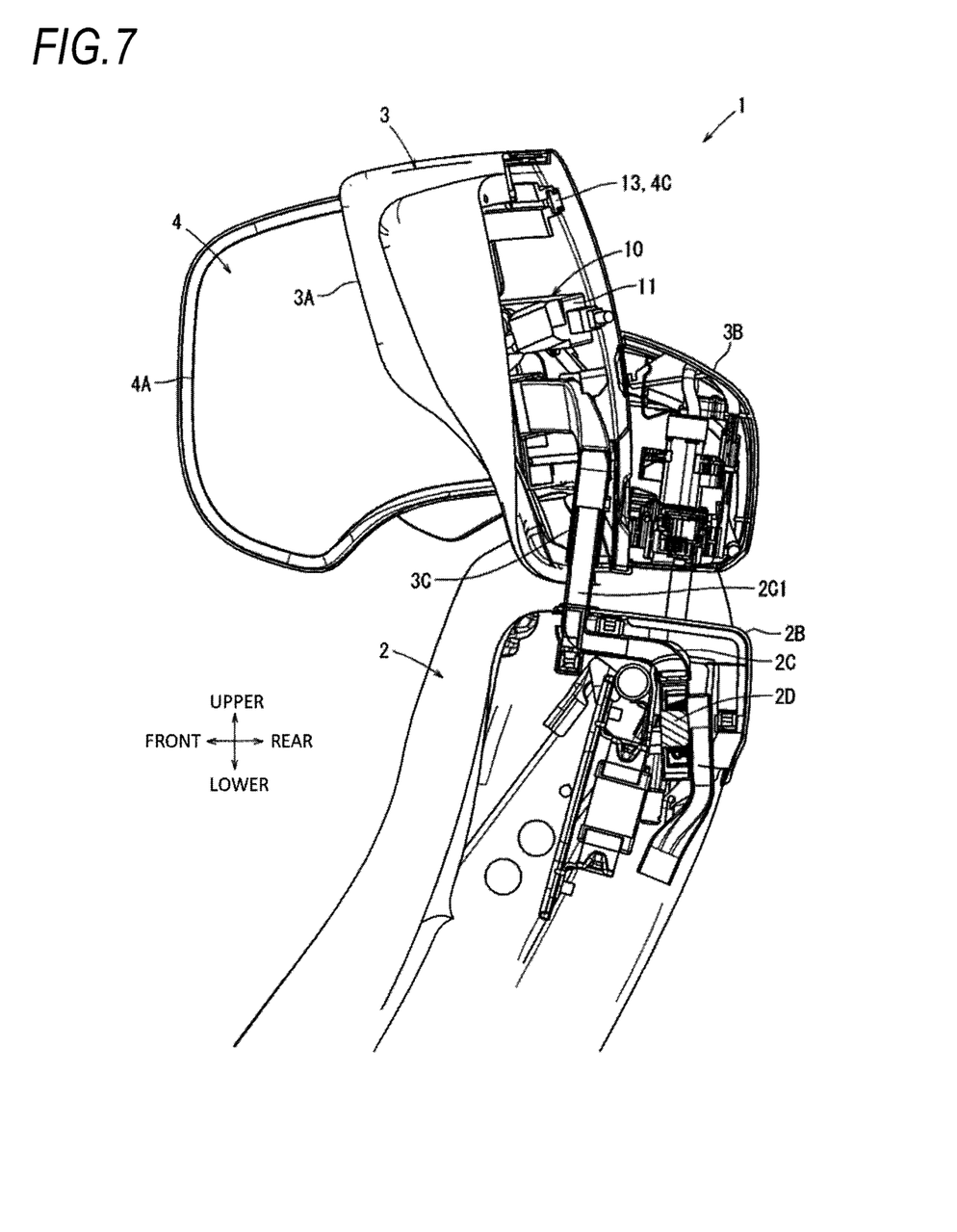
FIG. 7 is a cross-sectional view taken along line VII-VII in FIG. 4.

As shown in FIG. 7, the fixed duct 2C is provided so as to extend from a lower side to an upper side through a central portion of the seat back 2 on a back side. A blower 2D is connected to an intermediate path of the fixed duct 2C passing through a back side upper portion of the seat back 2. Air in the fixed duct 2C is blown toward the headrest 3 by the blower 2D. As shown in FIGS. 5 to 7, the fixed duct 2C is provided such that an end portion (protruding portion 2C1) of a pipeline of the fixed duct 2C protrudes upward from an upper surface central portion of the seat back 2.

A resin rear cover 2B is mounted to the back side upper portion of the seat back 2 such that the central portion provided with the fixed duct 2C is covered from the upper surface portion to a back portion of the seat back 2 in a reverse L-shape. The rear cover 2B serves as a maintenance cover that can be removed from the seat back 2 so as to be easily operated during maintenance work of the blower 2D and the fixed duct 2C. A portion of the rear cover 2B which covers the upper surface central portion of the seat back 2 has a shape extending to cover a periphery on a base side of the protruding portion 2C1 of the fixed duct 2C protruding from the upper surface central portion.

Due to the above shape, the portion of the rear cover 2B which covers the periphery of the protruding portion 2C1 of the fixed duct 2C functions as a bezel surrounding the periphery of the protruding portion 2C1 with a good appearance so as not to form a gap therebetween. In the present embodiment, the protruding portion 2C1 of the fixed duct 2C forms the pipeline that blows air toward the headrest 3, but the protruding portion 2C1 may be removed from a main body portion of the fixed duct 2C when such a function is unnecessary. By mounting a cap (not shown) to an opening of a terminal of the fixed duct 2C that is removed, the opening of the terminal of the fixed duct 2C can be covered with a good appearance.

As shown in FIG. 1, the headrest 3 has openings 3A, each of which opens forward in a vertically long shape as an entrance and an exit of each shade 4, along side edges on both left and right sides of a main body portion extending in the concave curved shape. The overhang adjustment mechanism 10 that individually performs drive control on each shade 4 is provided inside the headrest 3. The height adjustment mechanism 20 that adjusts the height position of the headrest 3 with respect to the seat back 2 is provided inside the headrest 3. As shown in FIGS. 5 to 7, a movable duct 3C that is fitted from above to the protruding portion 2C1 of the fixed duct 2C to connect flow paths is provided inside the headrest 3 in a fixed state.

As shown in FIG. 6, the overhang adjustment mechanism 10 includes motors 11 fixed at both left and right positions inside the headrest 3, operation links 12, each of which is rotationally operated with one end being connected to an output shaft 11A of each motor 11, and pairs of upper and lower curved rails 13 fixed at both left and right positions inside the headrest 3. Each curved rail 13 has a curved shape extending forward and is directed outward in the seat width direction along the curved shape of the headrest 3.

Sliders 4C fixed at positions corresponding to the shades 4 are respectively fitted to the curved rails 13 so as to be slidable along a longitudinal direction of the curved rails 13. Thereby, each curved rail 13 guides each shade 4 to enable the shade 4 to slide between the overhung position P1 and the retracted position P2, which are shown in FIG. 1, along the curved shape of each curved rail 13. As shown in FIG. 6, operation pins 12A provided at the other ends of operation links 12 are mounted by being inserted into long holes 4B, respectively, extending in a height direction formed in an intermediate portion of the shades 4.

With the above configuration, each operation link 12 is moved individually by drive control of each motor 11, whereby each shade 4 is individually moved between the overhung position P1 and the retracted position P2 which are shown in FIG. 1. Each shade 4 is stopped at any position while being moved by stopping movement of each operation link 12.

The height adjustment mechanism 20 includes the headrest stay 21 bent in a substantially M-shape, a fixed body 22 fixed to an upper portion of the headrest stay 21, a movable body 23 mounted to a lower portion of the headrest stay 21 so as to be slidable in the height direction, and a motor 24 fixed to the movable body 23. Leg portions 21A of the substantially M-shaped headrest stay 21 are inserted into corresponding headrest supports 2A provided on the upper surface portion of the seat back 2, whereby the headrest stay 21 is mounted in a state of being fixed to the headrest supports 2A.

The fixed body 22 includes fixed guides 22A, each of which is fitted to an upper portion of each leg portion 21A of the headrest stay 21 in a fixed state. The movable body 23 includes movable guides 23A, each of which is fitted to a lower portion of each leg portion 21A of the headrest stay 21 so as to be slidable in the height direction. The movable body 23 is connected to the fixed body 22 via a feed screw mechanism (not shown) connected to and drive-controlled by an output shaft of the motor 24. The feed screw mechanism (not shown) is configured to direct an axis in the height direction of the headrest 3, and pulls up the movable body 23 toward the fixed body 22 or pushes down the movable body 23 away from the fixed body 22 by drive control of the motor 24.

A pair of left and right support rods 23B extending in the height direction through the fixed body 22 are mounted to the movable body 23. A support bracket 23C to which the headrest 3 is mounted is fixed between extended tip end portions of the support rods 23B. With the above configuration, the height position of the headrest 3 with respect to the seat back 2 is adjusted by movement of the movable body 23 whose position is adjusted in the height direction with respect to the fixed body 22. The height adjustment mechanism 20 is provided at a central portion on a rear side of the headrest 3.

A resin rear cover 3B that covers the height adjustment mechanism 20 from behind is mounted to the central portion on the rear side of the headrest 3. The rear cover 3B serves as a maintenance cover that can be removed from the headrest 3 so as to be easily operated during maintenance work of the height adjustment mechanism 20 and the overhang adjustment mechanism 10.

As shown in FIG. 5, the movable duct 3C is provided at in front of the height adjustment mechanism 20 in the headrest 3. The movable duct 3C is provided in a central lower portion of the headrest 3 such that a lower end portion of a pipeline of the movable duct 3C opens. As the leg portions 21A of the headrest stay 21 are mounted by being inserted into the headrest supports 2A of the seat back 2, the movable duct 3C is fitted from above to the protruding portion 2C1 of the fixed duct 2C and assembled in a flow path connected state where the flow paths of the movable duct 3C and the fixed duct 2C are connected with each other as shown in FIG. 7.

By the above assembly, the movable duct 3C is in a state where the pipeline of the movable duct 3C is overlapped with that of the protruding portion 2C1 of the fixed duct 2C in the height direction. Thereby, even if the height position of the headrest 3 with respect to the seat back 2 is adjusted by the height adjustment mechanism 20, the movable duct 3C can maintain the flow path connected state where the flow path of the movable duct 3C is connected with that of the fixed duct 2C in such a manner that movement of the movable duct 3C is released by an overlapping allowance with the fixed duct 2C. As shown in FIG. 5, the movable duct 3C is branched left and right in the headrest 3, and the branched pipelines are inserted into the left and right shades 4 in an overlapped state.

Thereby, even if each shade 4 is moved with respect to the headrest 3 by the overhang adjustment mechanism 10, the movable duct 3C can maintain a flow path connected state where the flow path of the movable duct 3C is connected with that of each shade 4 in such a manner that the movement of the movable duct 3C is released by an overlapping allowance of pipelines with each shade 4. As shown in FIG. 1, each shade 4 blows out air sent from the movable duct 3C inward in the seat width direction toward an area in front of the head of the seated occupant from each air outlet 4A formed at a tip edge portion of each shade 4 extending forward.

Specifically, each air outlet 4A opens in a vertically long slit shape along an inner surface of the tip edge portion of each shade 4 extending forward. Each shade 4 is configured such that the air blown out from each outlet 4A is always blown toward a fixed point position in front of the head of the seated occupant regardless of an overhang amount of the shade 4, and a movement trajectory of the shade 4 moved by the overhang adjustment mechanism 10 is in an circular arc shape.

Thereby, the air blown out from each air outlet 4A is always blown to the fixed point position in front of the head of the seated occupant regardless of the overhang amount of each shade 4. Therefore, the air blown out from the left and right shades 4 can collide at the fixed point position in front of the head of the seated occupant, whereby the soft air diffused by the collision can be gently applied to the head of the seated occupant.

(Summary)

The seat 1 of the present embodiment is configured as follows. That is, a seat (1) includes: a backrest (2) configured to support a back of a seated occupant; a headrest (3) provided to an upper portion of the backrest (2) and configured to support a back of a head of the seated occupant; an overhang portion (4) configured to overhang forward so as to laterally cover the head of the seated occupant from a side portion of the headrest (3); an overhang adjustment mechanism (10) capable of adjusting an overhang amount of the overhang portion (4); and a height adjustment mechanism (20) capable of adjusting a height position of the headrest (3) with respect to the backrest (2).

According to the above configuration, the overhang amount of the overhang portion (4) in a front-rear direction can be adjusted by the overhang adjustment mechanism (10). Height positions of the headrest (3) and the overhang portion (4) can be adjusted by the height adjustment mechanism (20). Therefore, by these position adjustments, a position of the overhang portion (4) that laterally covers the head of the seated occupant can be appropriately adjusted according to a seated state of the seated occupant.

The seat (1) further includes a backrest angle adjustment mechanism (5) capable of adjusting a backrest angle of the backrest (2). According to the above configuration, even if a back of the seated occupant shifts due to reclining of the backrest (2), the overhang portion (4) can be adjusted to a position that matches the head of the seated occupant by the height adjustment mechanism (20).

The overhang portion (4) further includes an air outlet (4A) configured to blow out air inward in a seat width direction. According to the above configuration, since the air outlet (4A) is provided in the overhang portion (4), a configuration that blows air toward a face of the seated occupant can be rationally obtained.

The seat (1) further includes a duct (2C) that allows air to flow in a flow path through the backrest (2), the duct (2C) being inserted into the headrest (3) such that a flow path is overlapped with the headrest (3). The height adjustment mechanism (20) is provided in the headrest (3). According to the above configuration, since the height adjustment mechanism (20) and a release structure of the ventilation path of the duct (2C) accompanying movement of the mechanism are provided in the headrest (3), a structure of the backrest (2) is not complicated.

The overhang portion (4) is provided to both side portions of the headrest (3). According to the above configuration, a good personal space can be formed by narrowing a visual field both left and right sides of the seated occupant.

The overhang adjustment mechanism (10) has a structure capable of individually operating each overhang portion (4). According to the above configuration, convenience of adjusting the visual field such as narrowing the visual field on one side while widening the visual field on the other side can be improved by the overhang portion (4).

The height adjustment mechanism (20) includes: a headrest stay (21); a fixed body (22) fixed to an upper portion of the headrest stay (21); and a movable body (23) fitted to a lower portion of the headrest stay (21) and slidable in a height direction with respect to the fixed body (22). The headrest (3) is mounted to the movable body (23), and the height adjustment mechanism (20) is capable of adjusting the height position of the headrest (3) with respect to the fixed body (22).

Other Embodiments

Although one embodiment of the present disclosure has been described above, the present disclosure can be implemented in various forms in addition to the above embodiment.

1. The seat according to the present disclosure can be widely applied to seats used for vehicles other than automobiles such as vehicles on railways, and seats used for various vehicles such as aircrafts and ships, in addition to seats for automobiles. In addition, the seat can be widely applied to various seats, for example, spectator seats installed at sports facilities and facilities such as theaters, concert venues and event venues, as well as massage seats, in addition to seats for vehicles.

2. A dividing line between the backrest and the headrest may divide such that the headrest has a wide shape supporting the back of the head and the upper back of the seated occupant, that is, the back of the seated occupant is supported by both the backrest and the headrest.

3. The overhang portion may be formed in a shape overhanging forward from the side portion of the headrest in a concave curved surface shape, or may be formed in a straight plate shape or other shape overhanging forward. The overhang portion may be provided only to one side portion of the headrest. In addition, when overhang portions are provided to both side portions of the headrest, both of the overhang portions may be moved only synchronously. The overhang portion may have a configuration that does not include an air outlet.

4. The overhang adjustment mechanism and the height adjustment mechanism may be of a manual type in addition to the electric type. The height adjustment mechanism may be provided in the backrest to operate so as to adjust the height position of the headrest.

5. The duct may release the movement of the height adjustment mechanism in the flow path connected state by a so-called telescopic structure, or may release the movement of the height adjustment mechanism in the flow path connected state by another telescopic structure such as a bellows structure.

What is claimed is:

1. A seat comprising:
a backrest configured to support a back of a seated occupant;
a headrest provided to an upper portion of the backrest and configured to support a back of a head of the seated occupant;
an overhang portion configured to overhang forward so as to laterally cover the head of the seated occupant from a side portion of the headrest;
an overhang adjustment mechanism configured to adjust an overhang amount of the overhang portion; and
a height adjustment mechanism configured to adjust a height position of the headrest with respect to the backrest, wherein
the overhang portion further includes an air outlet configured to blow out air inward in a seat width direction.

2. The seat according to claim 1, further comprising:
a backrest angle adjustment mechanism configured to adjust a backrest angle of the backrest.

3. The seat according to claim 1, further comprising:
a duct that allows air to flow in a flow path through the backrest, the duct being inserted into the headrest such that the flow path is overlapped with the headrest,
wherein the height adjustment mechanism is provided inside the headrest.

4. The seat according to claim 1,
wherein the overhang portion is provided to both side portions of the headrest.

5. The seat according to claim 4,
wherein the overhang adjustment mechanism has a structure configured to individually operate each overhang portion.

6. The seat according to claim 1,
wherein the height adjustment mechanism includes:
a headrest stay;
a fixed body fixed to an upper portion of the headrest stay; and
a movable body fitted to a lower portion of the headrest stay and slidable in a height direction with respect to the fixed body,
wherein the headrest is mounted to the movable body, and
wherein the height adjustment mechanism is configured to adjust the height position of the headrest with respect to the fixed body.

7. The seat according to claim 1,
wherein the overhang portion is configured to overhang forward so as to laterally cover an entirety of the head of the seated occupant from the side portion of the headrest.

8. The seat according to claim 1,
wherein when the backrest is moved from a first position in which the overhang portion covers the head of the seated occupant from the side portion of the headrest to a second position in which the overhang portion is disposed without covering an exposed portion of the head of the seated occupant from the side portion of the headrest, the height adjustment mechanism adjusts the height position of the headrest so that the overhang portion covers the exposed portion of the head of the seated occupant from the side portion of the headrest.

* * * * *